(12) United States Patent
Go (10) Patent No.: US 7,069,262 B1
(45) Date of Patent: Jun. 27, 2006

(54) INFORMATION PROCESSING APPARATUS, RECORDING MEDIUM, AND METHOD FOR USING THEM

(75) Inventor: Naomi Go, Kanagawa (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 09/857,364

(22) PCT Filed: Oct. 4, 2000

(86) PCT No.: PCT/JP00/06916

§ 371 (c)(1),
(2), (4) Date: Jun. 4, 2001

(87) PCT Pub. No.: WO01/25961

PCT Pub. Date: Apr. 12, 2001

(30) Foreign Application Priority Data

Oct. 4, 1999 (JP) ................................ 11/282644

(51) Int. Cl.
*G06F 17/30* (2006.01)
(52) U.S. Cl. .............................. 707/3; 707/10
(58) Field of Classification Search ..................... 707/1, 707/2, 3, 4, 10, 101
See application file for complete search history.

(56) References Cited

U.S. PATENT DOCUMENTS

| | | | | |
|---|---|---|---|---|
| 5,666,490 | A * | 9/1997 | Gillings et al. ............. | 709/238 |
| 5,884,301 | A * | 3/1999 | Takano ........................... | 707/3 |
| 5,991,783 | A * | 11/1999 | Popa et al. .................. | 715/522 |
| 6,212,521 | B1 * | 4/2001 | Minami et al. ............... | 707/10 |
| 6,219,671 | B1 * | 4/2001 | de Vries et al. ............ | 707/102 |
| 6,360,215 | B1 * | 3/2002 | Judd et al. ..................... | 707/3 |
| 6,463,430 | B1 * | 10/2002 | Brady et al. ................... | 707/3 |
| 6,510,461 | B1 * | 1/2003 | Nielsen ........................ | 709/224 |
| 6,546,395 | B1 * | 4/2003 | DeKimpe et al. ........... | 707/101 |
| 6,567,797 | B1 * | 5/2003 | Schuetze et al. ............... | 707/2 |

FOREIGN PATENT DOCUMENTS

| | | |
|---|---|---|
| JP | 5-4274 | 1/1993 |
| JP | 7-249048 | 9/1995 |
| JP | 10-162011 | 6/1998 |
| JP | 10-240760 | 9/1998 |
| JP | 11-7452 | 1/1999 |
| JP | 11-143885 | 5/1999 |

OTHER PUBLICATIONS

Noto Nobuharu, Method and Device for Information Retrieval, Storage Medium for Storing Information Retrieval Program, Method and Device for Information Transmission, and Storage Medium for Storing Information Transmission Program, 11-143885, May 28, 1999.*
Kleinberg, M. Jon. Authoritative sources in a hyperlink environment, Journal of hte ACM, 1999, pp. 604-632.*
Klerfi et al. Image retrieval from the World Wide Web: Issues, Techniques, and System. ACM Computing Surveys, 2004, pp. 35-67.*
Carpentieri et al. Compression and Complexity of SEQUENCES 1997, Jun. 11, 1997, pp. 6.*

* cited by examiner

*Primary Examiner*—Jean M. Corrielus
*Assistant Examiner*—Baoquoc N. To
(74) *Attorney, Agent, or Firm*—Sonnenschein, Nath & Rosenthal LLP (57) ABSTRACT

The home page provided by a WWW server is described using <IDTAG> tag for assigning an object ID to objects such as a text, an image, and voice constituting the home page; in a search server, URL of the home page having the object and the object ID assigned to the object corresponded are stored; and when the object ID is received from the user terminal, URL of the home page corresponded to the object ID is searched and transmitted to the user terminal.

6 Claims, 10 Drawing Sheets

FIG.1

FIG. 2A HOME PAGE

FIG. 2B SOURCE FILE

```
http://www.aaa/sample.html
<HTML>
<HEAD>
<TITLE> OBJECT ID </TITLE>
</HEAD>
<BODY>
    <IDTAG ID=1111111 Date=1999/01/01 10:00
    Make="TARO" Att="SABURO"
    Key="ERASER"Kind=Gif>
        <IMG SRC="YAMADA-SAN.gif">
    </IDTAG>
    <IDTAG ID=1111111 Date=1999/01/01 10:00
    Make="TARO" Att="SABURO"
    Key="ERASER"Kind=text>
        <P> YAMADA-SAN, TODAY . . .
    </IDTAG>
    <IDTAG ID=1234567 Date=1996/01/23 13:00
    Att="NANAKO">
        <IMG SRC="KAWABATA-SAN.gif">
    </IDTAG>
</BODY>
</HTML>
```

FIG.3

| OBJECT ID | LOCATION INFORMATION (URL) | ID ATTACHED DATE | ID PREPARER | ID ATTACHER | KEY WORD | OBJECT-KIND | OTHERS-FOR EXPANSION | IMPORTANCE DEGREE |
|---|---|---|---|---|---|---|---|---|
| 1111111 | http://www.aaa/sample.html | 999/01/01 10:00 | TARO | SABURO | ERASER | IMAGE | | 98 |
| 1111111 | http://www.aaa/sample.html | 998/01/01 10:00 | TARO | SABURO | ERASER | TEXT | | 88 |
| 1111110 | http://www.c/sample.html | 996/04/01 10:00 | TARO | JIRO | STATIONARY | VOICE | | 70 |
| 2222222 | http://www.222/sample.html | 999/05/01 10:00 | HANAKO | MOMOKO | GAME | PROGRAM | | 80 |
| ... | | | | | | | | |

INFORMATION PROCESSING APPARATUS, RECORDING MEDIUM, AND METHOD FOR USING THEM

RELATED APPLICATION DATA

This application claims priority from Japanese Patent Application No. P11-282644 filed Oct. 4, 1999 and International Application No. PCT/JP00/06916 filed Oct. 4, 2000. All of the forgoing applications are incorporated herein by reference to the extent permitted by law.

BACKGROUND OF THE INVENTION

1. Technical Field

The present invention relates to an information processing apparatus and method, and a recording medium, and particularly relates to an information processing apparatus and method, and a recording medium capable of easily obtaining desired information by a user.

2. Background Art

In the internet having been popularized rapidly, recently, information can be easily provided by WWW (World Wide Web). That is, it is possible for WWW to provide information according to a so-called hyper text by a file described in a page description language called HTML (Hyper Text Markup). The file described in HTML is generally called the home page, and a location on the internet where the home page is present is expressed by position information called URL (Uniform Resource Locator). Further, the home page (HTML file) is interpreted and displayed by WWW browser, but the home page interpreted and displayed by WWW browser is designated by URL thereof.

Incidentally, the internet is a network of a world scale, and an enormous number of home pages are present, thus making it difficult for a user himself to find the desired home page out of such an enormous number of home pages. So, the home page called a search engine is present on the internet, and in such a home page as described, when a key word is input, a list of URL for home pages on which words matched to the key word are described is provided in the form of the home page. For example, in a server having a function as a research engine for carrying out full sentence matched type search, URL for home pages and key words used for search for the home pages are corresponded and registered in the data base. When a key word is input, URL corresponded to the key word is searched to provide a list therefor.

Accordingly, in the conventional search engine, for example, when a person's name is input as a key word, URL for the home page on which the name is described is searched. Therefore, URL for the home page on which the other person of the same family and personal name as a person the name input as a key work is sometimes included in the home page on which a list of URL is displayed as a result of search. In this case, it is necessary for a user to see, from a list of URL displayed, comments on URL, that is, generally, comments displayed on the home page together with URL as a result of search for URL and representative of an outline of the home page specified by URL displayed to find the desired URL of the home page, failing to carry out easy search.

Further, in the conventional search engine, search for URL is carried out for a text described in the home page as an object, that is, search is carried out according to whether or not a key word transmitted from a user is included in the text described in the home page, and it is difficult to carry out search with images and voices constituting the home page as objects. As the search result, a user is sometimes impossible to obtain the desired URL for the home page.

DISCLOSURE OF THE INVENTION

The present invention has been accomplished in view of the circumstances as described above. It is an object of the present invention to provide an information processing apparatus and method, and a recording medium useful for use with these apparatus and method, capable of easily obtaining the desired information through a communication network.

An information processing apparatus according to the present invention proposed for achieving such an object as described includes receiving means for receiving discrimination information assigned to an object constituting information transmitted from a terminal; discrimination information assigned to the object constituting information; search means for searching position information corresponded to the discrimination information from the terminal from a data base for storing the discrimination information assigned to the object constituting information and position information on the discrimination information; preparing means for preparing a list of position information searched; and transmission means for transmitting the list of the position information to the terminal.

The data base for storing the discrimination information and the position information corresponded can be further provided on the information processing apparatus.

Further, collection means for collecting, from information present on a network, discrimination information of an object constituting the information, and position information of the discrimination information to register the collected discrimination information and the position information corresponded in the data base can be further provided on the information processing apparatus.

In the collection means, related information in relation to an object is collected, and the position information and the related information are corresponded to the discrimination information and registered in the data base.

The related information may include a key word used to search the discrimination information assigned to the object. In this case, the receiving means receives also a key word transmitted from the terminal, the search means also searches also the discrimination information corresponded to the related information including the key word received by the receiving means, and the transmission means transmits also the search result of the discrimination information.

In the information processing apparatus, adding means for adding an importance degree to the object can be further provided. In this case, the preparing means may prepare a list of the searched position information on the basis of the importance degree. Further, in the information processing means, issuing means for issuing discrimination information not registered in the data base in response to a request from the terminal can be further provided.

Here, for information, a file described in a predetermined description language can be used. As the predetermined description language, HTML (Hyper Text Markup Language) can be used, and for the position information, URL (Uniform Resource Locator) can be used.

An information processing method according to the present invention includes receiving step for receiving discrimination information assigned to an object constituting information transmitted from a terminal; search step for searching position information corresponded to the discrimination information from the terminal from a data base for storing the discrimination information assigned to the object constituting information and position information on the discrimination information; preparing step for preparing a list of position information searched; and transmission step for transmitting the list of the position information to the terminal.

Further, in a recording medium according to the present invention is recorded a program including a search step for searching position information corresponded to discrimination information from a terminal, from a data base storing discrimination information assigned to an object constituting information transmitted from a terminal and position information of the discrimination information corresponded, and a preparing step for preparing a list of the searched position information.

In the information processing apparatus and method according to the present invention, the position information corresponded to the discrimination information corresponded to the discrimination information from the terminal is searched from the data base storing the discrimination information assigned to an object constituting information transmitted from a terminal and the position information of the discrimination information corresponded, and the list of the searched position information is prepared.

Another information processing apparatus according to the present invention includes transmission means for transmitting the discrimination information assigned to the object constituting information to the server; receiving means for receiving a list of position information with respect to information constituted from the object to which the discrimination information is assigned transmitted from the server corresponding to the transmission of the discrimination information; and display control means for displaying the list of position information.

Another information processing apparatus further comprises input means for inputting discrimination information to be transmitted to the transmission means.

Another information processing apparatus further comprises request means for requesting the issue of discrimination information to the server.

Another information processing apparatus further comprises request means for requesting the search of discrimination information by a key word to the server.

The information can be placed in a file described in a predetermined description language.

Here, also, for information, a file described in a predetermined description language can be used.

Another information processing method according to the present invention includes transmission step for transmitting the discrimination information assigned to the object constituting information to the server; receiving step for receiving a list of position information with respect to information constituted from the object to which the discrimination information is assigned transmitted from the server corresponding to the transmission of the discrimination information; and display control step for displaying the list of position information.

Another recording medium according to the present invention has a program recorded therein, the program including transmission step for transmitting the discrimination information assigned to the object constituting information to the server; receiving step for receiving a list of position information with respect to information constituted from the object to which the discrimination information is assigned transmitted from the server corresponding to the transmission of the discrimination information; and display control step for displaying the list of position information.

In another information processing apparatus and method according to the present invention shown herein, the discrimination information assigned to the object constituting information is transmitted to the server, and the list of position information with respect to information constituted from the object to which discrimination information transmitted from the server corresponding to the transmission is received and displayed.

Another information processing apparatus according to the present invention further includes first receiving means for receiving discrimination information assigned to an object constituting information transmitted from a terminal; search means for searching position information corresponded to discrimination information from the terminal, from the data base storing discrimination information assigned to the object constituting information and position information with respect to the information corresponded; preparing means for preparing a list of position information searched; first transmission means transmitted to the terminal; second receiving means for receiving a list of position information with respect to information constituted from an object to which discrimination information is assigned transmitted from the server corresponding to the transmission of discrimination information; and display control means for displaying the list of position information.

In another information processing apparatus and method according to the present invention shown herein, discrimination information assigned to the object constituting information transmitted from the terminal is received; position information corresponded to discrimination information from the terminal is searched from the data base storing discrimination information assigned to the object constituting information and position information of the discrimination information corresponded; and the list of position information of the searched position information is prepared and transmitted to the terminal. On the other hand, the discrimination information assigned to the object constituting information is transmitted to the server, and the list of position information with respect to information constituted from the object to which the discrimination information transmitted from the server corresponding to the transmission is received and displayed.

Other objects of the present invention and the concrete advantages obtained by the present invention will become further apparent from ensuing description of the embodiments.

BRIEF DESCRIPTION OF THE DRAWINGS

FIGS. 2 (A) and (B) are respectively views showing the home page described using ID tag.

FIGS. 13 (A) and (B) are respectively views showing display examples of the home page described using ID tag.

MODE FOR CARRYING OUT THE INVENTION

The information processing apparatus and method, and the recording medium according to the present invention will be described in detail.

First, one example of the network system to which the present invention is applied will be described with reference to FIG. 1.

In the network system shown in FIG. 1, WWW servers $1_1$ to $1_N$ (will be hereinafter described as WWW server 1 as long as WWW servers $1_1$ to $1_N$ need not be discriminated) store HTML file, and image data, voice data, programs and so on constituting the home page. WWW server 1 transmits, for example, when URL is transmitted from a user terminal 3 through an internet 2, HTML file specified by URL, HTML specified by URL and so on to the user terminal 3 through the internet 2. In this case, in the WWW browser of the user terminal 3, HTML file is interpreted and displayed.

Here, in the home page displayed as the result that WWW browser interpreted HTML file, texts, image data, voice data, programs and so on as occasion demands. In the following description, elements constituting the home page sch as texts, image data, voice data, programs and so on as described above are suitably called the object.

The user terminal 3 is constituted, for example, by a computer and so on, in which WWW browser for perusing the home page is installed. The user who peruses the home page starts WWW browser installed in the user terminal 3 to input URL. The input URL is transmitted to the WWW server 1 through the internet 2. In the WWW server 1, HTML file specified by URL from the user terminal 3 as described above is transmitted to the user terminal 3 whereby in the WWW browser of the user terminal 3, HTML file is interpreted and displayed.

The search server 4 provides the home page as a search engine (will be hereinafter suitably called the search page). Accordingly, the user terminal 3 is able to get access to the search page similarly to getting access to the ordinary home page to thereby enable searching URL, That is, the search server 4 searches, when receives a search request of URL, searches URL matched to the request so as to transmit a list thereof in the form of the home page to the user terminal.

In the present embodiment, in the home page provided in the WWW server 1 is described, as occasion demands, object ID (Identification) assigned to the object constituting the home page.

That is, in the present embodiment, the tag of HTML is expanded so that the object ID may be described, and ID tag <IDTAG> is newly defined as such a tag as described. The object ID can be assigned to the object by the ID tag.

Figure 2A:
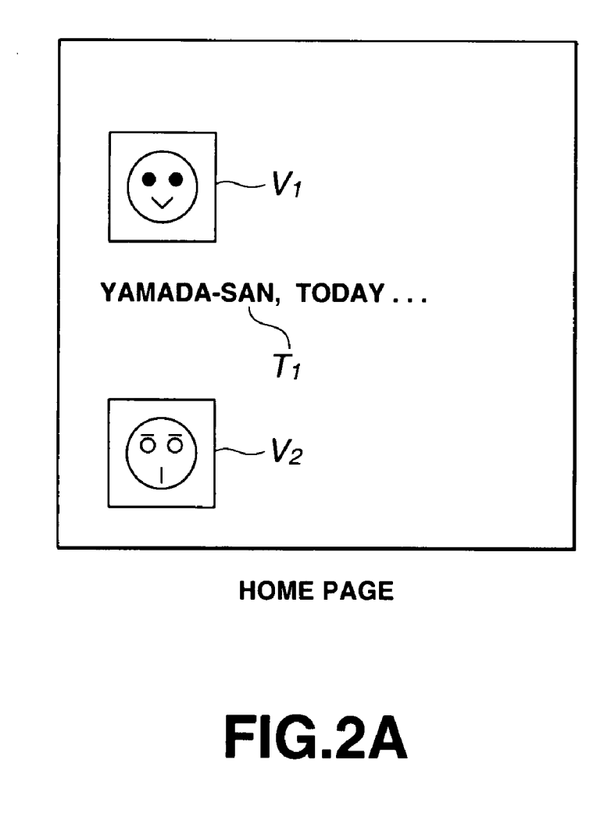
Figure 2B:
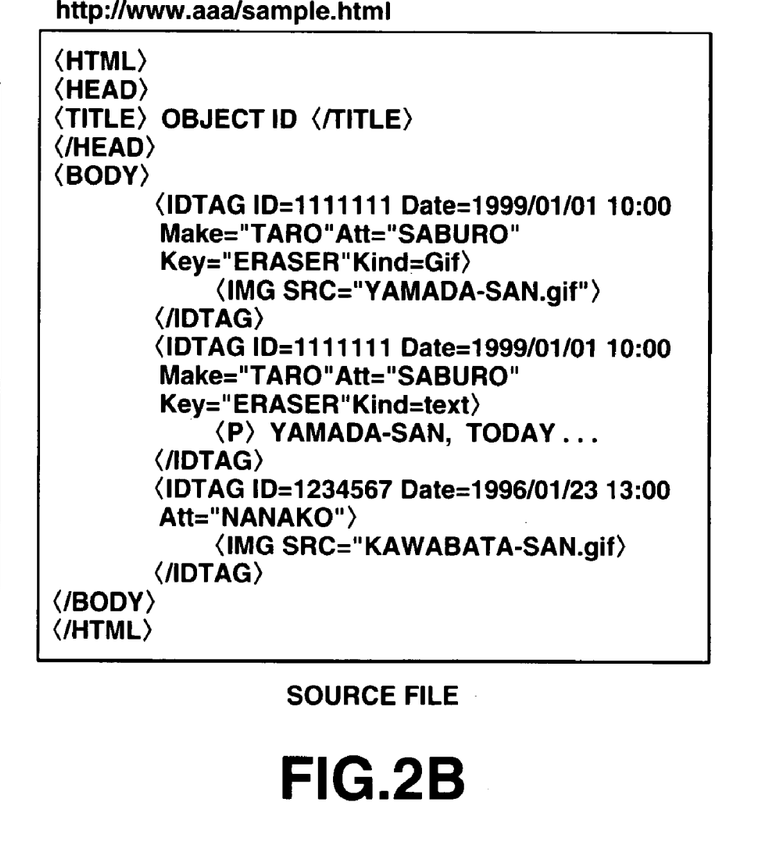

FIG. 2 (A) and FIG. 2 (B) show the home page described using the ID tag.

FIG. 2 (A) and FIG. 2 (B) show the home page in a state that the HYML file is interpreted and displayed by the WWW browser, and the source for the home page (actual described contents of the HTML file), respectively.

In the embodiment of FIG. 2 (A), the home page is constituted by three objects in total: images $V_1$ and $V_2$ with a face as a motif, and a text $T_1$ comprising [YAMADA-SAN, TODAY . . . ].

In the present embodiment, the tag of HTML is expanded so that the object ID may be assigned to the object, as described above. That is, in the source file of HTML shown in FIG. 2 (B), <IDTAG> tag (ID tag) is also used in addition to the existing <HTML> tag, <HEAD> tag, <TITLE> tag, <BODY> tag, <IMG> tag, and <P> tag. A tag without/is a start tag, and a tag with/is an end tag.

The <IDTAG> tag is the tag for assigning the object ID to the object, and ID, Date, Make, Att, Key, and Kind can be described as genus thereof.

Genus ID is used to designate object ID assigned to the object described between the start tag <IDTAG> and the end tag </IDTAG>. Genus Date is used when a date having the object ID assigned to the object is described. Genus Make is used when a name for discriminating a preparer who prepared the object is described. Genus Att is used when a name for discriminating a person by who assigned the object ID is described. Genus Key is used to describe a key word when the object ID is searched. Genus Kind is used to designate a data form of the object (for example, data are a text, an image or voice; and an image is JPEG form, GIF form, etc.).

Out of the above-described genera, description of ID is indispensable, but description of other genera is optional.

Figure 1:
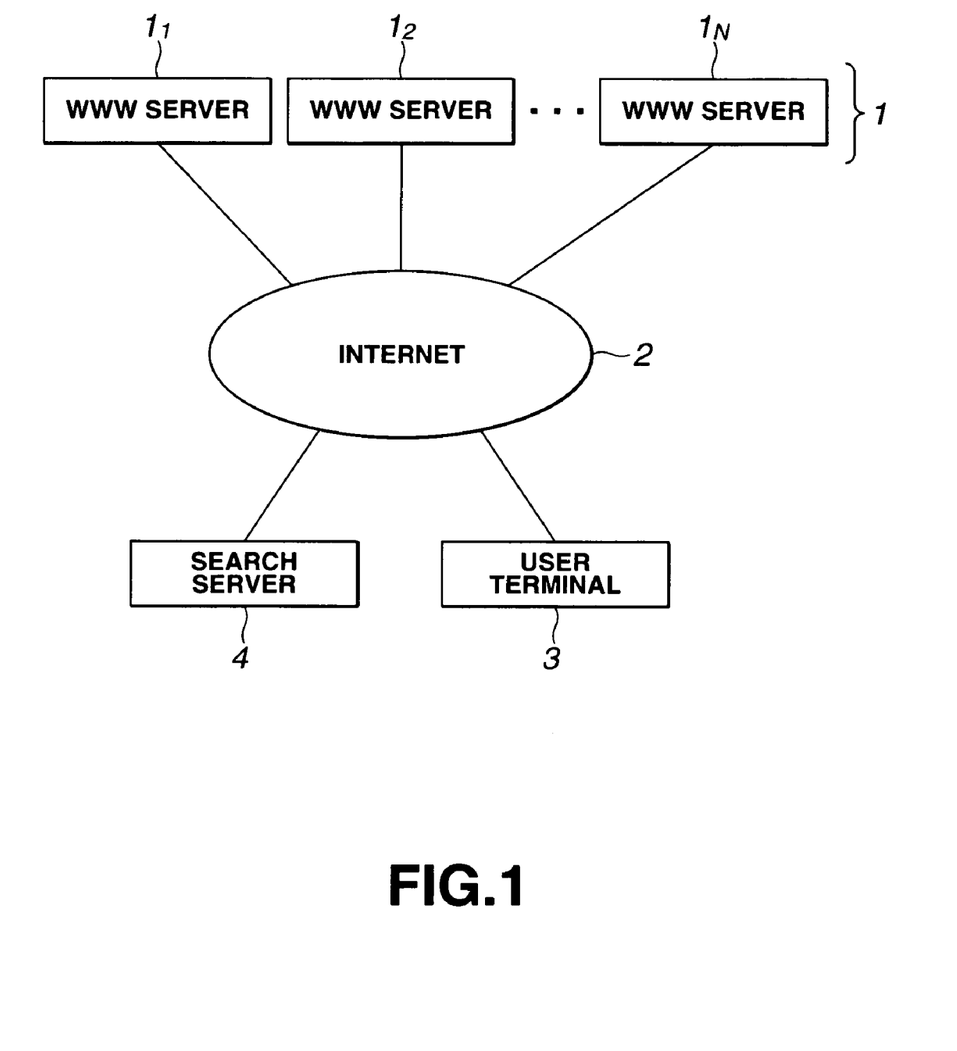
FIG. 1 is a block diagram showing one example of the network system to which the present invention is applied.
Figure 3:
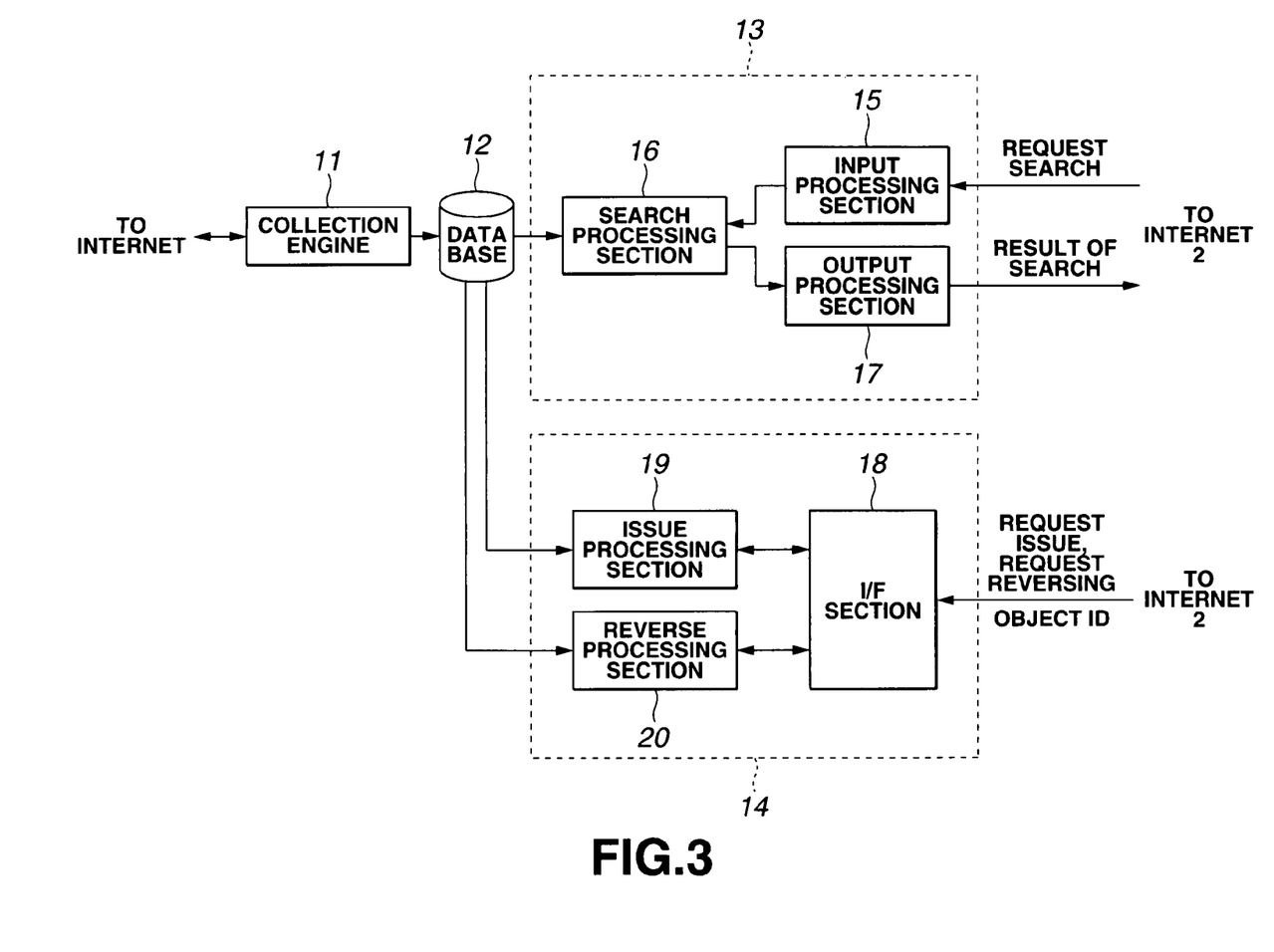
FIG. 3 is a block diagram showing the search server constituting the network system shown in FIG. 1.

FIG. 3 shows the search server 4 constituting the network system shown in FIG. 1. A collection engine 11 collects information of the home page controlled by the WWW server 11 on the internet 2 by carrying out collection control described later, and registers the object assigned to the object constituting the home page and other information, and URL of the home page including the object corresponded in the data base 12. The data base 12 with the object ID and so on supplied from the collection engine 11 and URL corresponded is stored.

Figure 4:
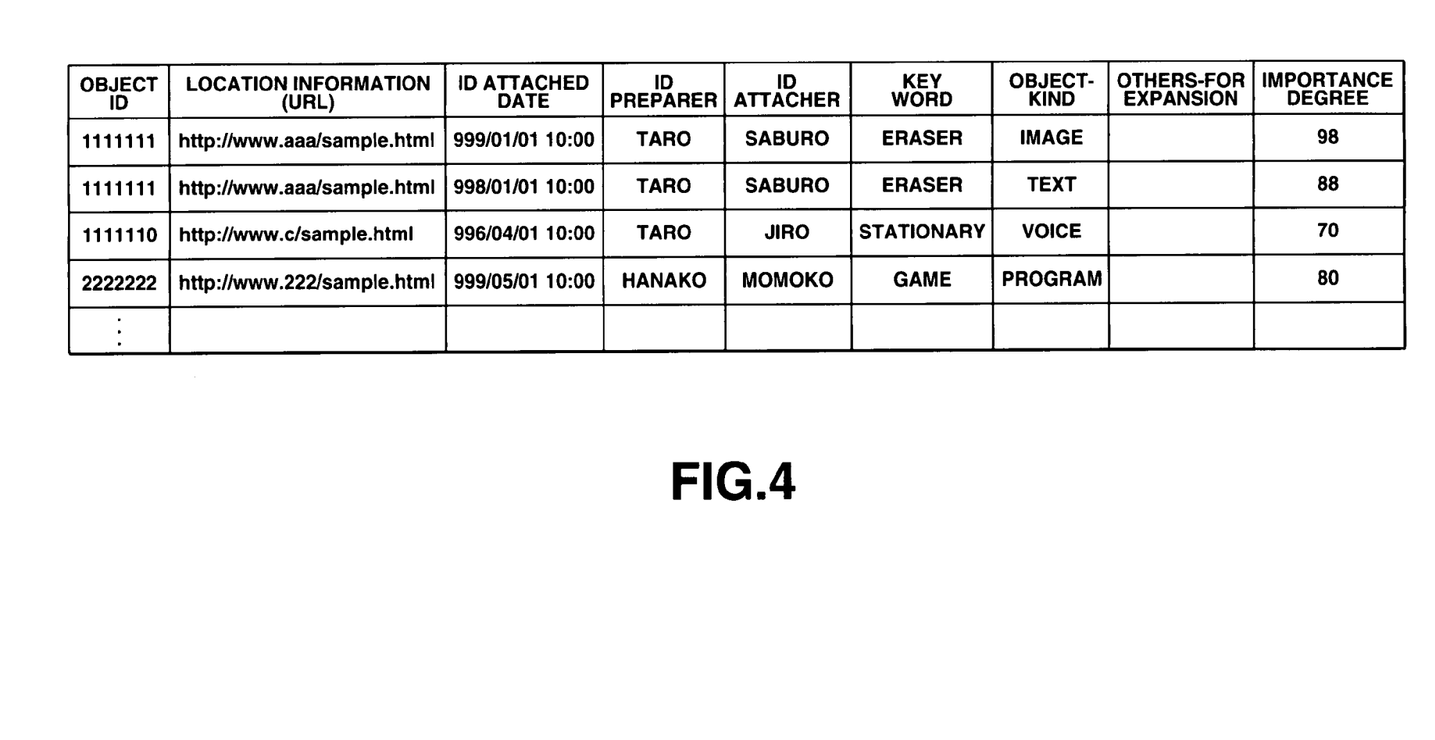
FIG. 4 is a view showing the stored contents of the data base shown in FIG. 3.

That is, FIG. 4 shows data stored in the data base 12.

In the data base 12, stored in each record are the object ID with respect to the object, and presence information, an ID attached date, an ID preparer, an ID attacher, a key word, a kind of object, other data, and an importance degree corresponded.

URL of the object is described on the column of the presence information. Information in accordance with the genera Data, Make, Att, Key, and Kind of the <IDTAG> tag described in FIG. 2 (B) are described on the column of an ID attached date, an ID preparer, an ID attacher, a key word, and a kind of object. The column of data for expansion is the column for describing, when the genus of the <IDTAG> tag is expanded in future, information of the expanded genus and so on. The importance degree of the object is described on the column of the importance degree.

The importance degree of the object is computed on the basis of the genus of the <IDTAG> tag in the collection engine 11. That is, the collection engine 11 sets the importance degree to a higher value, for example, as the date described in the genus Date is close to the present time. Further, the collection engine 11 sets, for example, where the names of the genera Make and Att are coincided, the importance degree higher than that of the different case.

Out of the records of the data base shown in FIG. 4, the record in the first line from top is prepared with respect to the image $V_1$ as the object shown in FIG. 2, and the record in the second line is prepared with respect to the text $T_1$ as the object shown in FIG. 2. In FIG. 2, URL of the home page is http://www.aaa/sample.html. Returning to FIG. 3, the search engine 13 carries out search processing for searching the data base in response to the request from the user terminal 3.

That is, the search engine 13 is constituted by an input processing section 15, a search processing section 16, and an output processing section 17. The input processing section 15 receives the search request of URL of the object, which is transmitted through the internet 2 from the user terminal 3, that is, URL of the home page constituted including the object, to supply it to the search processing section 16. The search processing section 16 searches the data base 12 in accordance with the search request from the input processing section 15 to supply URL as the search result to the output processing section 17. The output processing section 17 processes such that a list of URL as the search result from the search processing section 16 may be displayed in the form of the home page (prepares HTML file of such a home page) to transmit it to the user terminal 3 having transmitted the search request through the internet 2.

The control engine 14 comprises an I/F (Interface) section 18, an issue processing section 19, and a reverse processing section 20, which sections carry out the issuing processing and the reverse processing described later.

That is, the I/F section 18 receives an issue request and a reverse request supplied through the internet 2 form the user terminal 3, supplies them to the issue processing section 19 and the reverse processing section 20, respectively, and transmits the object ID supplied from the issue processing section 19 and the reverse processing section 20 to the user terminal 3 through the internet 2.

The issue request termed herein means a request for the issue of the object ID assigned to the object. The reverse request means a request for the research of the object ID assigned to the object.

The issue processing section 19 refers to, when receives the issue request from the I/F section 18, the data base 12 to recognize the object ID not used and return the objet ID to the I/F section 18. The reverse processing section 20 searches, when receives the reverse request from the I/F section 18, the object ID assigned to an object and return it to the I/F section 18.

Figure 5:
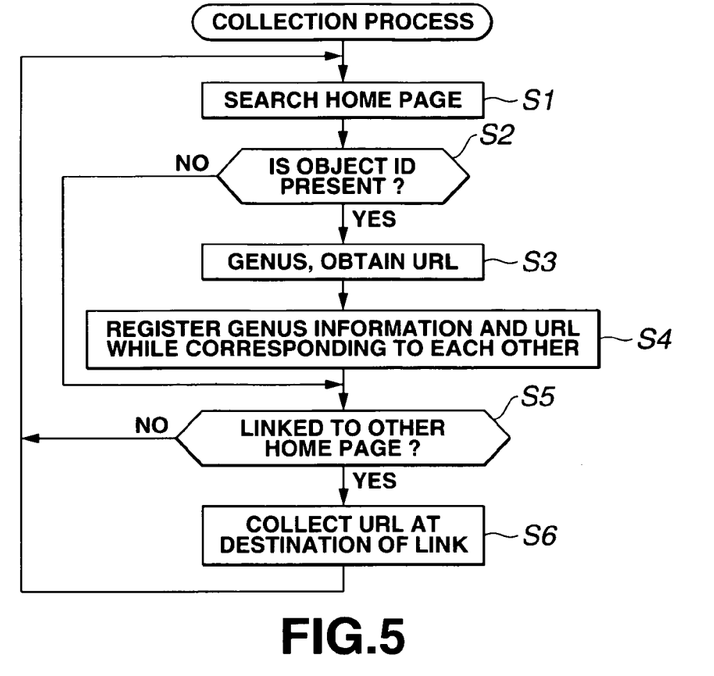
FIG. 5 is a flow chart for explaining the collection processing by the search server.

Next, the collection processing carried out in the collection engine 11 of the research server 4 will be described with reference to the flow chart of FIG. 5.

In the collection processing, first, in Step S1, a home page (a home page controlled by the WWW server 1) on the internet 2 is searched, and the procedure proceeds to Step S2, then, in Step S2, judgment is made of whether or not the object ID is described, that is, whether or not the <IDTAG> tag is present, in the HTML file as the source file of the searched home page (hereinafter referred to as an attention home page). In Step S2, where judgment was made of that the <IDTAG> tag is not present in the attention home page, the procedure skips Steps S3 and S4 and proceeds to Step S5.

Where judgment was made of that the <IDTAG> tag is present in the attention home page, the procedure proceeds to Step 3 to obtain the genus described in the <IDTAG> tag, and URL of the home page (the attention home page). That is, for example, where the home page that URL shown in FIG. 2 (B) is http://www.aaa/sample.html is the attention home page, with respect to the object specified by the description <IMG SRC="YAMADA-SAN.gif> between the start tag <IDTAG ID=1111111 Date=1999/01/01 10:00 Make="TARO"Att="SABURO" Key="eraser" Kind=Gif>, and the end tag </IDTAG>, http://www.aaa/sample.html which is URL of the attention home page, and genus ID=1111111, Date=1999/01/01, 10:00 Make="TARO", Att="SABURO", Key="eraser", Kind=Gif described in <IDTAG> tag are obtained.

Thereafter, the procedure proceeds to Step 4, and the collection engine 11 has URL of the home page obtained in Step S3 and the genus corresponded, which is registered as shown in FIG. 4, for example.

The processing of Step 3 and Step 4 is carried out for all <IDTAG> which are present in the home page searched in Step S1.

After the processing in Step 4, the procedure proceeds to Step 5, and judgment is made of whether or not a link is extended from the home page searched in Step 1 to the other home page. Where, in Step 5, judgement was made of that a link is extended to the other home page, that is, where URL of the other home page is described, for example, by <A> tag, on the home page searched in Step S1, the procedure proceeds to Step S6, and processing similar to the case of Steps S2 to S6 is carried out for the other home page. Then, the procedure returns to Step S1, and the similar processing is repeated for the home page not researched.

On the other hand, where in Step S5, judgment was made of that a link was not extended from the home page searched in Step S1 to the other home page, the procedure returns to Step S1, and the similar processing is repeated for the home page not researched.

Next, the search processing carried out in the search server 4 will be described with reference to the flow chart of FIG. 6.

When the request for connection is brought through the internet 2 from the user terminal, in the search server 4, the connection relative to the user terminal 3 is established, and the procedure proceeds to Step 12, in which step, judgment is made of whether or not the search research for requesting search of URL of the home page including the object ID and the object to which the object ID is assigned is transmitted from the user terminal 3.

In Step 12, where judgment was made of that the search request was transmitted along with the object ID, the procedure proceeds to the step S13, and the input processing section 15 receives the object ID to output it to the search processing section 16.

The search processing section 16 searches, when receives the object ID from the input processing section 15, URL corresponded to the object ID referring to the data base 12, in Step S14, to output URL as the search result to the output processing section 17.

The output processing section 17 prepares the home page (hereinafter suitably referred to as the search result page) on which URL from the search processing section 16 is displayed, in Step 15. Where a plurality of URLs are searched in the search processing section 16, the output processing section 17 is caused to prepare the search result page in which the plurality of URLs are arranged in suitable order, or can be sometimes caused to prepare the search result page arranged in order of the high importance degree described in FIG. 4.

When the output processing section 17 prepares the search result page, the procedure proceeds to Step S16, and the search result page is transmitted to the user terminal 3 through the internet 12, to complete the search processing.

While in the above-described case, only the URL corresponded to the object ID transmitted along with the search request from the user terminal 3 is displayed on the search result page, it is noted that in addition thereto, the outline relating to the object specified by URL and the object ID can be displayed on the search result page.

Figure 7:
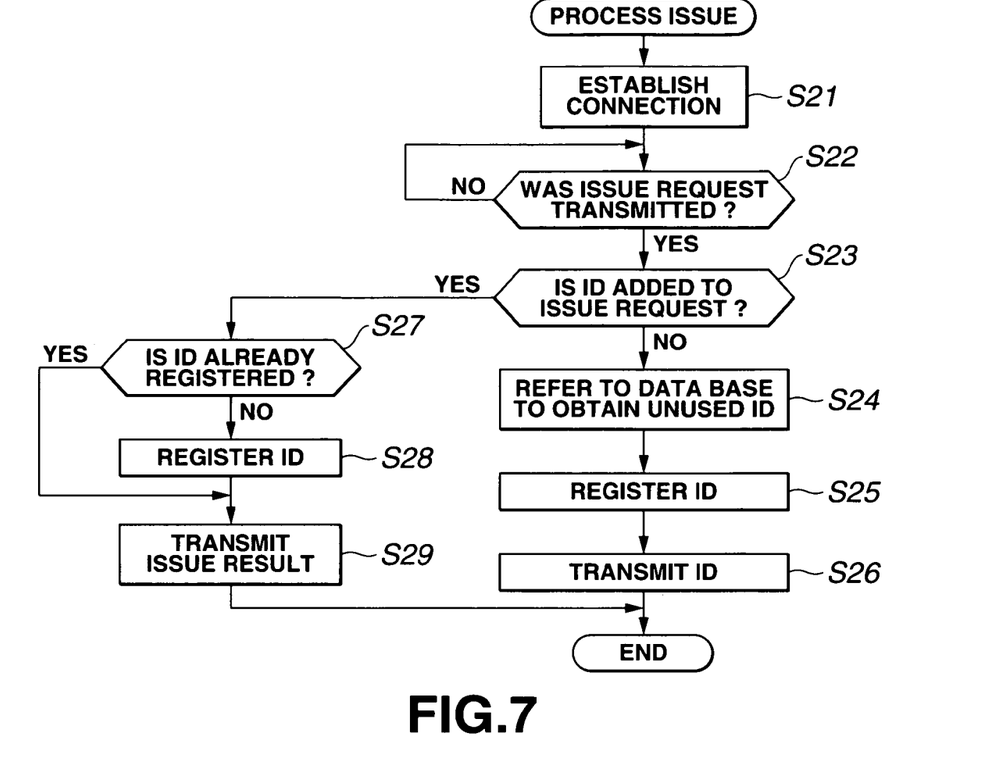
FIG. 7 is a flow chart for explaining the issue processing by the search server.

In the following, the issue processing carried out in the search server 4 will be described with reference to the flow chart of FIG. 7.

When the request for the connection is brought through the internet 2 from the user terminal 3, in the search sever 4, the connection relative to the user terminal 3 is established in Step S21. The procedure proceeds to Step S22, the I/F section 18 judges whether or not the request for the issue for requesting the issue of the object ID is transmitted from the user terminal 3. In Step S22, where judgment was made of that the request for the issue is not transmitted, the procedure returns to Step S22, In Step S22, where judgment was made of that the request for the issue is transmitted, the procedure proceeds to Step S23, and judgment is made whether or not the object ID is transmitted along with the request for the issue.

That is, in the present invention, where the object ID is issued to the user, the search server 4 can issue the object ID determined by the search server 4 and can also issue the object ID desired by the user as well. Where the user requests the issue of the object ID desired by himself, the user operates the user terminal 3 to transmit the object ID desired to be issued along with the request for the issue. In Step S23, judgment is made whether or not the object ID is transmitted along with the request for the issue.

Where judgment is made of that the object ID is not transmitted along with the request for the issue in Step S23, that is, where only the request for the issue is transmitted, the I/F section 18 receives the request for the issue to transmit it to the issue processing section 19. Then, the procedure proceeds to Step S24.

The issue processing section 19 obtains the object IDs not registered (the unused ID) referring to the data base 12 in Step S24. The procedure proceeds to Step S25, and one of them is registered in the data base 12. The issue processing section 19 supplies the object ID registered in the data base 12 to the I/F section 18. The procedure proceeds to Step S26. The I/F section 18 transmits the object ID from the issue processing section 19 to the user terminal 3 through the internet 2, in Step S26 to thereby issue the object ID and end the issue processing.

On the other hand, where in Step S23, judgment was made of that the object ID was transmitted along with the object ID, the I/F section 18 supplies the object ID to the issue processing section 19. The procedure proceeds to Step S27.

The issue processing section 19 judges, in Step S27, whether or not the object ID from the I/F section 18 is already registered in the data base 12. In Step S27, where the object ID from the I/F section 18 is not registered in the data base 12, the procedure proceeds to Step S28, and the object Id is registered in the data base 12. The issue processing section 19 supplies the message to the effect that the object ID is registered (hereinafter suitably referred to as the registration message) to the I/F section 18. The procedure proceeds to Step S29. The I/F section 18 transmits the registration message from the issue processing section 19 to the user terminal 3 through the internet 2 in Step S29 to end the issue processing.

Further, where in Step S27, the object ID from the I/F section 18 is already registered in the data base 12, the issue processing section 19 supplies the message to the effect that the object ID cannot be registered (hereinafter suitably referred to as the registration disable message) to the I/F section 18, and the procedure skips Step S2 and proceeds to Step S29. The I/F section 18 transmits the registration disable message from the issue processing section 19 to the user terminal 3 through the internet 2 and ends the issue processing.

Where the object ID was issued by the issue processing, the record having only the object ID is registered in the data base 12, but thereafter, when the home page including the object to which the object ID was assigned by the user is prepared to upload it on the internet 2, the above-described collection processing is carried out whereby URL of the home page including the object to which the object ID was assigned by the user, and genera except the object ID are registered as shown in FIG. 4.

Next, the reverse processing carried out in the search server 4 will be described with reference to the flow chart of FIG. 8.

When the request for the connection is brought through the internet 2 from the user terminal 3, in the search server 4, the connection relative to the user terminal 3 is established in Step S31, and the procedure proceeds to Step S32. The I/F section judges whether or not the request for the reverse for requesting the search for the object ID from the key word is transmitted from the user terminal 3 along with the key word used for the search. Where judgment was made in Step S32 that the reverse request and the key word are not transmitted, the procedure returns to Step S32.

Further, where judgment was made in Step S32 that the reverse request and the key word are transmitted, the I/F section 18 outputs the reverse request and the key word to the reverse processing section 20, and the procedure proceeds to Step S33.

In Step S33, the reverse processing section 20 refers to the data base 12 to thereby search the record in which the key word coincided with the key word from the I/F section 18 to extract the object ID registered in the record.

Then, the reverse processing section 20 outputs the extracted object ID to the I/F section 18, and the I/F section 18 in turn transmits the object ID from the reverse processing section 20 to the user terminal 3, in Step S34, and ends the reverse processing.

According to the reverse processing as described above, the user is able to know the object ID of the object to which a key word is attached.

Figure 9:
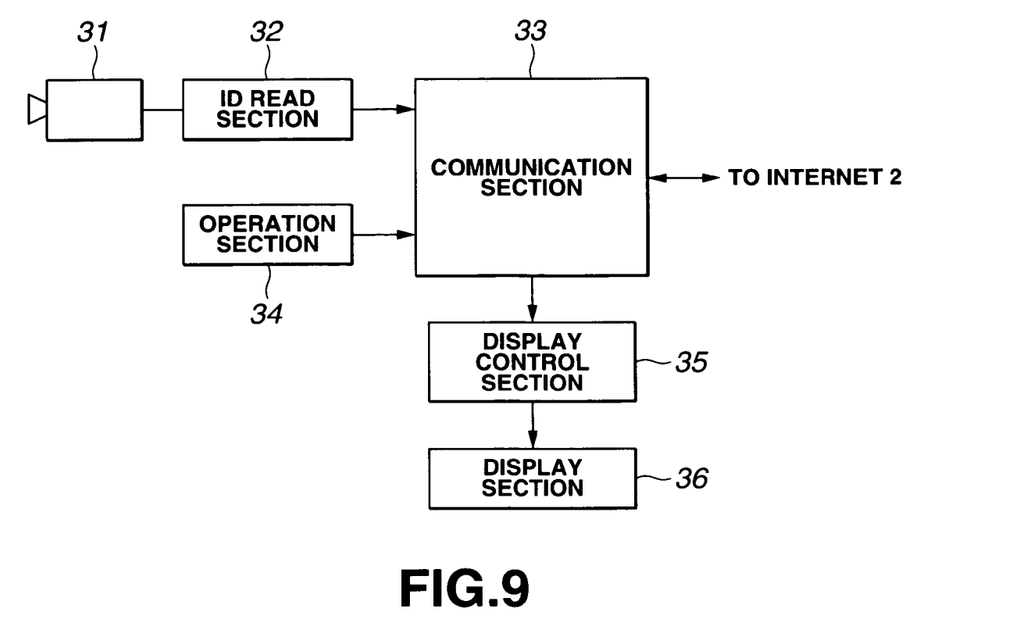
FIG. 9 is a block diagram showing the user terminal constituting the network system shown in FIG. 1.

Next, the user terminal 3 constituting the network system shown in FIG. 1 will be described in more detail. The user terminal 3 is provided with a camera 31 as shown in FIG. 9. This camera 31 takes a photograph of an object to thereby output the image on which the object is displayed to the ID read section 32. The ID read section 32 carries out, for example, the image recognition with respect to the image from the camera 31 to thereby recognize, that is, read the object ID of the object related to the object.

That is, in the embodiment shown here, for example, the objects related to the goods such as an eraser, for example, such as the image on which the goods are photographed, the text for explaining the goods, and the object ID assigned to the voice are displayed. The ID read section 32 reads the object ID displayed on the goods from the image from the camera 31. The object ID read by the ID read section 32 is supplied to the communication section 33.

On the goods, the object ID itself can be displayed, and, for example, those in the form of a bar code can be displayed. Further, the object ID is not always displayed on the goods, but in the ID read section 32, it is also possible to recognize the image of the goods from the camera 31 to recognize the object ID of the object related to the goods from the result of recognition. Accordingly, the object photographed by the camera 31 need not be the goods, but a person, an animal such as a dog, and a plant may be included.

The communication section 33 communicates with the WWW server 1 and the search server 4 through the internet to exchange various kinds of data. That is, the communication section 33 transmits the object ID and data corresponding to the operation of the operation section 34 to the WWW server 1 and the search server 4 through the internet 2. The communication section 3 receives and supplies data, for example, such as HTML file, transmitted through the internet 2 from the WWW server 1 and the search server 4 to the display control section 35.

The operation section 34 is composed of, for example, such as a keyboard, and a mouse so as to impart a command, and necessary data to the communication section 33. The operation section 34 may be composed of, for example, a microphone and a voice recognition device. In this case, in the operation section 33, the user's voice as the command is voice-recognized to impart the voice recognition result to the communication section 33.

The display control section 35 receives data from the communication section 33 to display it on the display section 36. The display section 36 is composed of, for example, a liquid crystal panel and CRT (Cathode Ray Tube), to carry out the display in accordance with the control from the display control section 35.

In the user terminal 3 constituted as described above, the search request processing for requesting the search for the home page including the object from the object ID of the object related to an object, the issue request processing for requesting the issue of the object ID assigned to the object, or the reverse request processing for requesting the search for the object ID of the object corresponding to the key word from the key word are carried out.

So, first, the search request processing will be described with reference to the flow chart of FIG. 10.

The user photographs, for example, when desires the detailed information with respect to an object, the object with a camera 31. The image of the object obtained by the camera 30 is supplied to the ID read section 32, and the ID read section 32 reads, from the image, the object ID of the object related to the object displayed on the image to supply it to the communication section 3. The communication section 33 requests the search server 4, when receives the object ID from the ID read section 32, the connection through the internet 2 in Step S41, and when the connection relative to the search server 4, the procedure proceeds to Step S42 to transmit the object ID from the ID read section 32 along with the search request.

Figure 6:
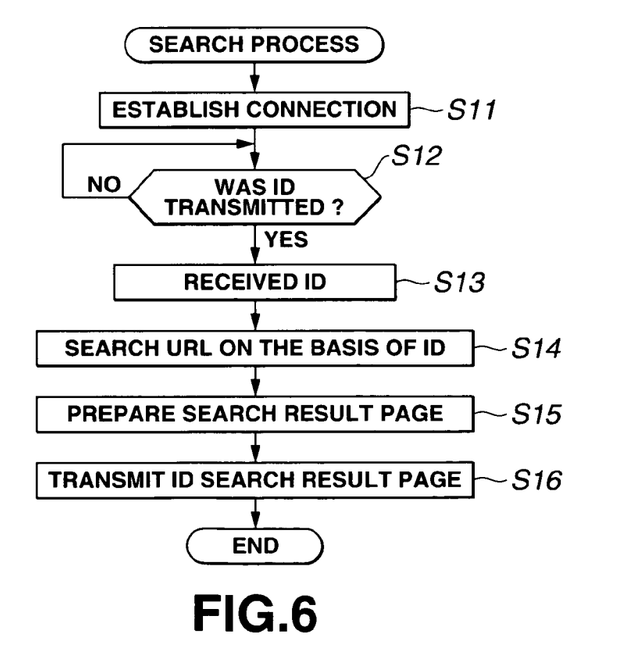
FIG. 6 is a flow chart for explaining the search processing by the search server.

In the search server 4 having received the object ID and the search request, the search processing is carried out as described in FIG. 6, and the search result page is transmitted, and therefore, in the communication section 33, judgment is made whether or not the search result page is transmitted from the search server 4 in Step S43.

Where in Step S43, judgment is made of that the search result page is not transmitted, the procedure returns to Step S43 to wait till the search result page is transmitted. Further, where in Step S 43, judgment is made of that the search result page was transmitted, the communication section 33 receives the search result page to supply it to the display control section 35, and the procedure proceeds to Step S 44.

In Step S44, the display control section 35 causes the search result page from the communication section 33 to display on the display section 36 to end the search request processing.

The search result page is the home page on which is displayed URL of he home page including the object corresponded to the object ID transmitted along with the search request by the user, and accordingly, the user is able to easily obtain information related to the object photographed by the camera 31.

That is, where a person as the object is photographed by the camera 31, the object ID assigned to th object related to the person is transmitted to the search server 4 from the user terminal 3. Accordingly, since in the search server 4, URL of the home page including the object related to the person photographed by the camera 31 is searched, only such URL is displayed on the search result page. Since only URL of the home page including the object related to the person photographed by the camera 31 is displayed in the manner as described, the desired information can be obtained easily as compared with the case where URL of the home page on which is described information related to a plurality of persons of the same family and personal name as in the case where search is made by a key word in the conventional search engine.

Further, the data forms of the object to which the object ID is assigned may be the text, of course, or JPEG and GIF and other video data, or may be WAV and AU and other audio data, and the search with the image or voice as objects can be carried out.

While in the above-described case, the object is photographed by the camera 31, and in the ID read section 32, the object ID of the object related to the object is obtained from the object output by the camera 31 is obtained, it is noted alternatively that the object ID may be also input, for example, by operating the operation section 34. The object ID of the object related to the object enables to be notified to the user by issuing the magazine or the like which prints the object ID on an advertisement of the object, or prints the object ID of the object related to the object.

Further, where the object ID is obtained by the ID read section 32, the object itself is not photographed by the camera 31, but a photograph or an image on which the object is displayed can be photographed.

Figure 11:
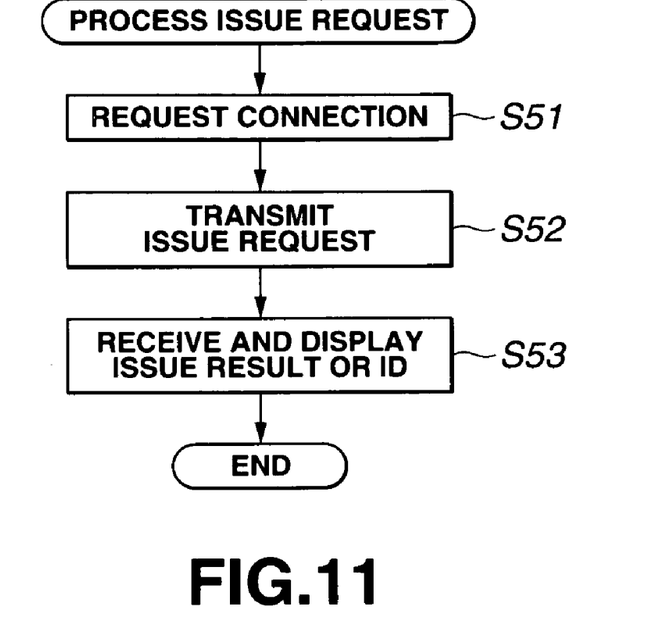
FIG. 11 is a flow chart for explaining the issue request processing by the user terminal.

Next, the issue request processing will be described with reference to the flow chart of FIG. 11.

When the user desires to assign the object ID to the object constituting the existing home page or the home page prepared in future, the user operates the operation section 34 to input the command (hereinafter suitably referred to as the issue request command) for causing the user terminal 3 to carry out the issue request processing.

The issue request command is received by the communication section 33, and when the communication section 33 requests, when receives the issue request command, the search server 14 the connection through the internet 2 in Step S54 to establish the connection with the search server 4, then the procedure proceeds to Step S52 to transmit the issue request to the search server 4.

In the search server 4 which receives the issue request, the issue processing is carried out as described in FIG. 7, and since the registration message or the registration disable message (both of which will be hereinafter suitably referred to as the registration result message) or the issued object ID is transmitted, the communication section 33 receives the registration result message or the object ID receives in Step S53 and supplies it to the display control section 35. Further, in Step S53, the display control section 35 supplies the registration result message or the object ID to the display section 36 for display, and the issue request processing ends.

Where an optional object ID is desired to be issued, the user will suffice merely to operate the operation section 34 to input the issue request command, but where an object ID having a value descried by himself, it is necessary for the user to operate the operation section 34 to input the issue request command and input the object ID desired also. In this case, in Step S52, the input object ID is also transmitted along with the issue request.

Figure 12:
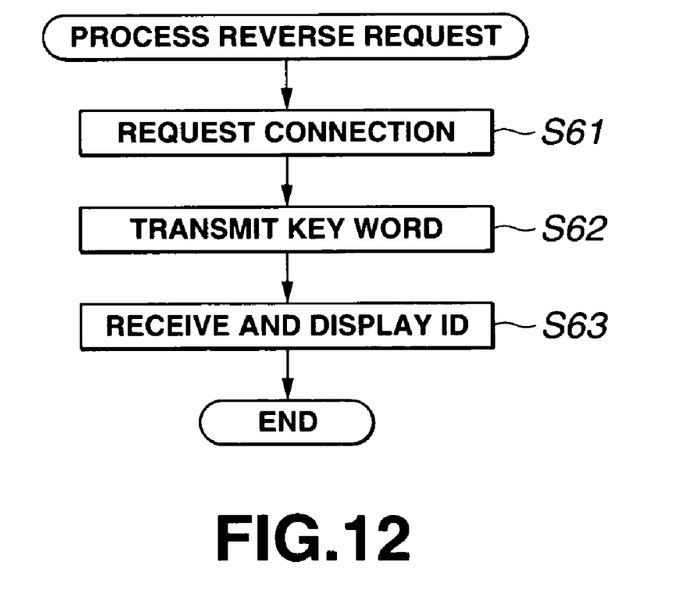
FIG. 12 is a flow chart for explaining the reverse request processing by the user terminal.

Next, the reverse request processing will be described with reference to the flow chart of FIG. 12.

Where the user desires to obtain URL of the home page including the object related to an object, it is necessary to transmit the object ID to the search server 4 to carry out the search request, but the object or the image on which the object is displayed is not present near oneself, or when th object ID of the object related to the object is not known, the search request cannot be carried out.

So, according to the reverse request processing, when a key word is input with respect to the object, the object ID of the object related to the object can be obtained.

That is, the user operates, when desires to know the object ID of the object related to an object, the operation section 34 to input a key word along with the command (hereinafter suitably referred to as the reverse request command) for causing the user terminal 3 to carry out the reverse request processing.

The reverse request command and the key word are received by the communication section 33. The communication section 33 requests, when receives the reverse request command and the key word, the search server 4 the connection through the internet 2 in Step S61, when the connection with the search server 41 is established, the procedure proceeds to Step S62 to transmit the reverse request command and the key word to the search server 4.

Figure 8:
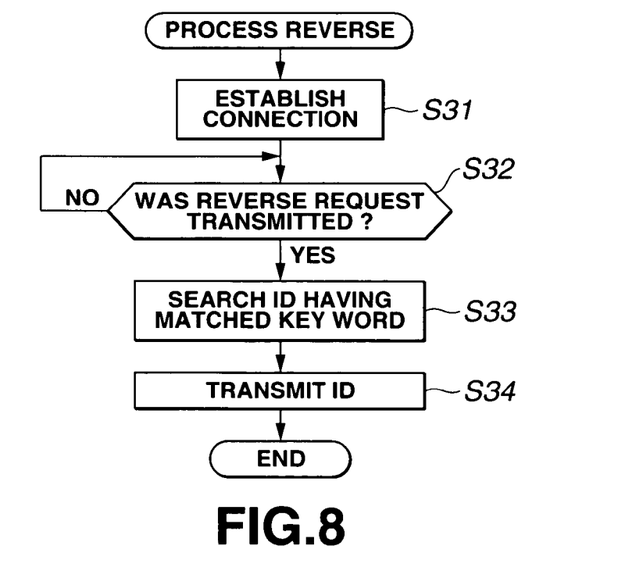
FIG. 8 is a flow chart for explaining the reverse processing by the search server.

In the search server 4 having received the reverse request command and the key word, the reverse processing is carried out as described in FIG. 8 whereby in the data base 12 (see FIG. 4), the object ID corresponded to the key word is searched and transmitted, and therefore, in Step S 63, the communication section 33 receives the object ID to supply it to the display control section 35. Further, in Step S 63, the display control section 35 supplies the object ID to the display section 36 for display, and the reverse request processing ends.

Figure 10:
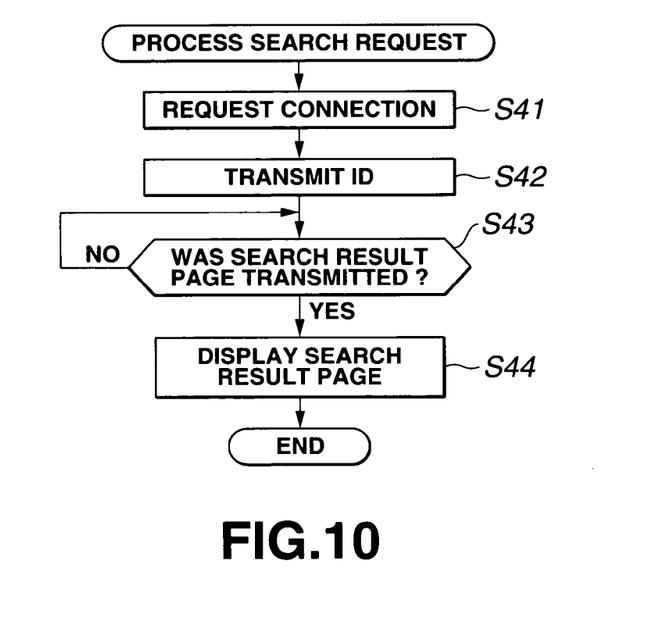
FIG. 10 is a flow chart for explaining the search request processing by the user terminal.

The user carries out the search request processing described in FIG. 10 using the object ID obtained as described above to obtain URL of the object related to the desired object.

Where the home page on which the <IDTAG> tag is described is displayed by the WWW browser, when the cursor is moved on the object specified by the description surrounded by the <IDTAG> tag, it is possible to display the object ID assigned to the object.

Figure 13A:
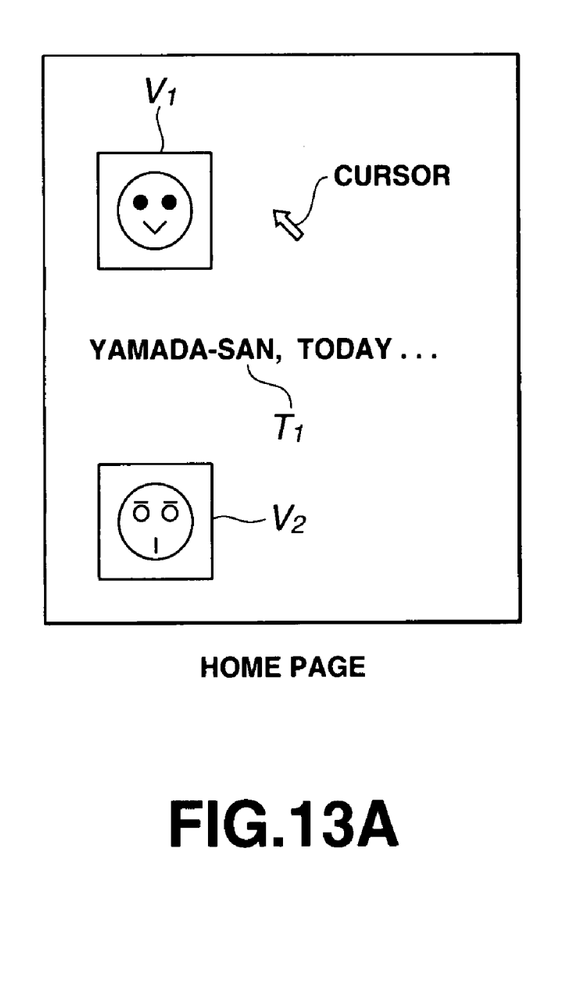
Figure 13B:
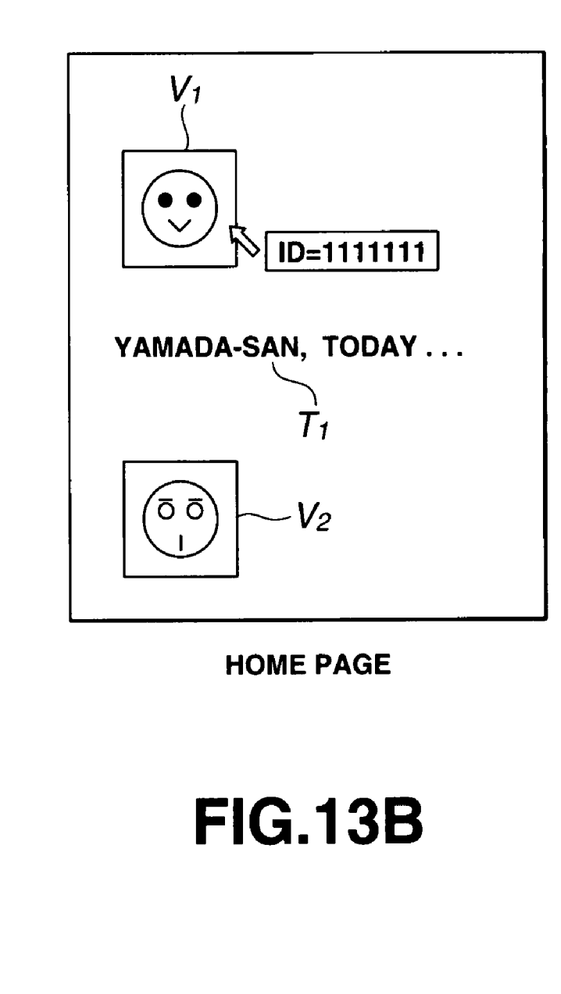

That is, according to the HTML file shown in FIG. 2 (B), in the WWW browser, the home page as shown in FIG. 13 (A) similar to that shown in FIG. 2 (A) is displayed but in this case, when the cursor is moved on the image $V_1$ as the object, the object ID [1111111] assigned to the image $V_1$ as the object can be displayed on the WWW browser as shown in FIG. 13 (B).

Further, when others assign the object ID described in a home page without leave, information becomes confused, and therefore, some measure is desirably taken so the use of the object ID as described above can be prohibited.

A series of processing as described above can be carried out by a hardware as well as a software. Where the series of processing is carried out by a software, a program constituting the software is installed on a general-purpose computer or the like.

Figure 14:
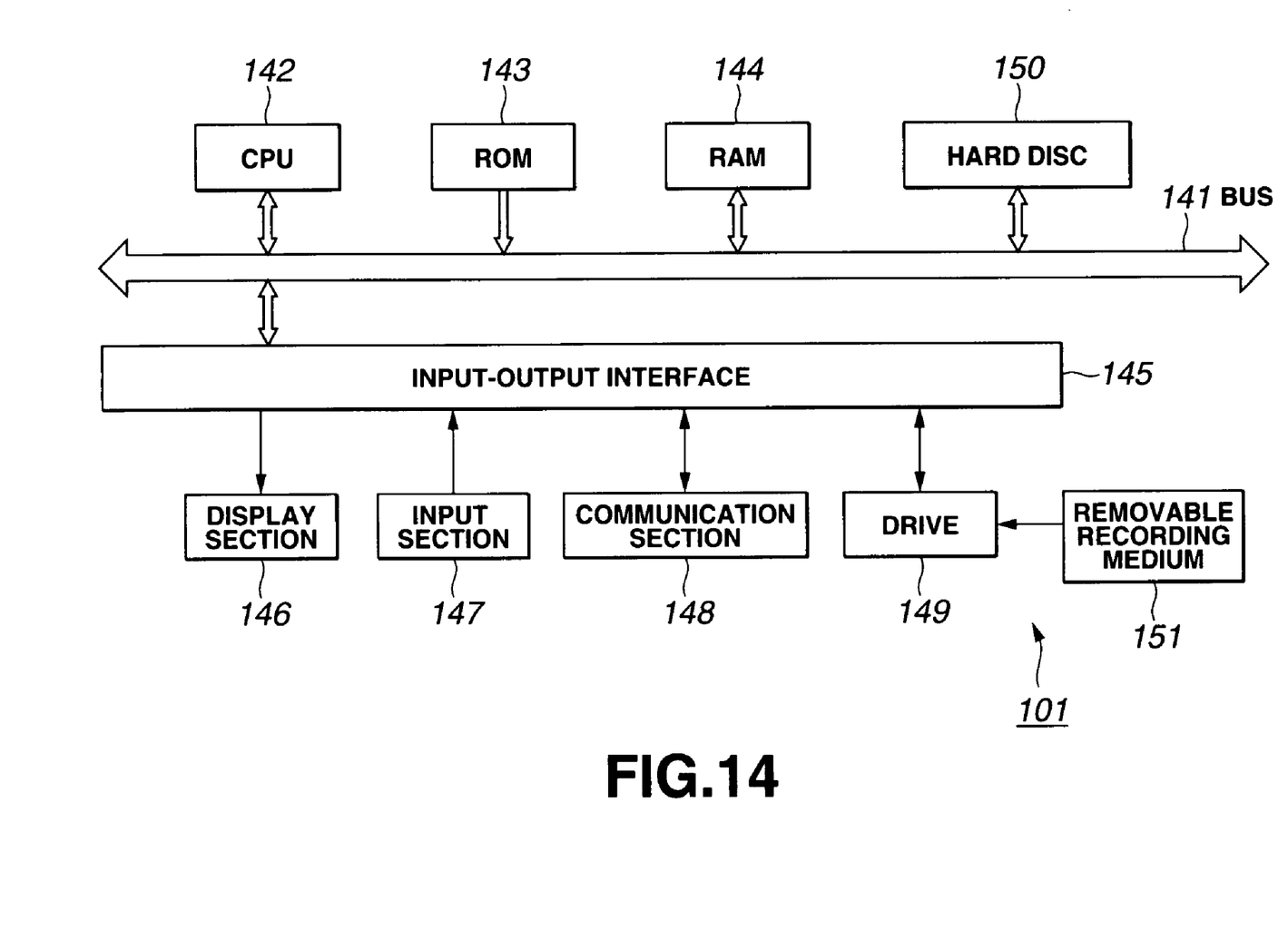
FIG. 14 is a block diagram showing one example of the computer for executing a program recorded in the recording medium to which the present invention is applied.

FIG. 14 shows one example of a computer in which the program for executing the aforementioned series of processing is installed.

The program can be recorded in advance in a hard disc 150 as a recording medium encased in a computer 101 or ROM 243 as a semiconductor memory.

Alternatively, the program can be stored or recorded temporarily or permanently in a removable recording medium 151 such as a floppy disc, CD-ROM (Compact Disc Read Only Memory), MO (Magneto optical) disc, DVD (Digital Versatile Disc), a magnetic disc, and a semiconductor memory. Such a removable recoding medium 151 can be provided as a so-called package soft-ware.

In addition to the above, the program is transferred, from the down-load side, to the computer 101 by radio through the artificial satellite for digital satellite broadcasting, is transferred to the computer by wire through network such as LAN (Local Area Network) and an internet, and can be installed on a hard-disc 102 encased.

In the description of the present invention, the processing steps for describing programs for causing the computer to carry out various processes not always need to be process in time series along the order described as a flow chart, but, for example, processing executed in parallel or individually or processing according to the object is included.

Further, the program may be processed by a single computer, or may be processed by being scattered by a plurality of computers. Further, the program may be transferred to a distant computer for execution.

The computer 101 encases therein CPU (Central Processing Unit) 142. An input-output interface 145 is connected to CPU 142 through a bus 141. When a command is input as a result that the input section 147 constituted by a keyboard or a mouse is operated by the user through the input-output interface 145, CPU 142 executes the program stored in ROM (Read Only Memory) 143 accordingly. Further, CPU 142 loads, on RAM (Random Access Memory) 144, and executes a program stored in a hard-disc 150, a program which is transferred from a satellite or a network, received by a communication section 148 and installed in the hard-disc 150, or a program which is read from a removable recording medium 151 mounted on a drive 149 and installed on the hard-disk. Then, CPU 142 outputs the processed result, for example, to a display section 146 constituted by LCD (Liquid Crystal Display) or the like through the input-output interface 145, as occasion demands, or the processed result is transmitted from the communication section 148.

As the object ID, characters such as alphabet and symbols in addition to numerals can be used.

INDUSTRIAL APPLICABILITY

According to the present invention, as described above, discrimination information assigned to the object constituting information transmitted from the terminal is received, position information corresponded to discrimination information from the terminal is searched from the data base storing discrimination information assigned to the object constituting information and position information of the information corresponded, and a list of the searched position information is prepared and transmitted the terminal. On the other hand, the discrimination information assigned to the object constituting the information is transmitted to the server, and a list of position information with respect to information constituted from the object to which the discrimination information transmitted from the server corresponding to the transmission is received and displayed, and therefore, the position information including the desired object can be obtained easily.

What is claimed is:

1. An information processing apparatus for providing position indicative of a position of a home page having at least one object and being present on a network, the apparatus comprising:
   a database storing discrimination assigned to the object and said position information of the corresponding home page;
   collections means for receiving a search request from a terminal, the search request including discrimination information assigned to the object from the home page and the position information of the home page and for registering the collected discrimination information and position information in said data base, wherein said collection means collects related information related to said object and register said position information and related information corresponding to said discrimination information in said database;
   receiving means for receiving a search request from a terminal, the search request including discrimination information assigned to the object;
   search means for searching the database for and ding said position information corresponding to the discrimination information of the search request;
   preparing means for preparing a list of said position information found by the search means;
   issue means for issuing new discrimination assigned to the object and storing said new discrimination on said database when said discrimination information has not previously registered in said database;
   addition means for adding a degree of importance of the object; and
   transmission means for transmitting said list of position information and said new discrimination information to said terminal;
   wherein said preparing means prepare the list of said position information arranged in order to the degree of importance;
   wherein said related information includes a keyword used to search for discrimination information assigned to said object and the apparatus further comprises:
   interface means for receiving said keyword transmitted from said terminal; and
   reverse processing means for search said discrimination information corresponding to the keyword received from said interface means;
   wherein said transmission means transmits the search result including said discrimination to said terminal for use in creating said search request.

2. The information processing apparatus according to claim 1, wherein the terminal includes an audiovisual camera for obtaining discrimination information from a subject corresponding to said object, said subject being a person, product, text, other image, or representation of the person or product, the discrimination information obtained by the camera being for use in creating said search request.

3. The information processing apparatus according to claim 1 wherein the home page is a file described in HTML (Hyper Text Markup Language) and said position information is in the form of a URL (Uniform Resource Locator).

4. The information processing apparatus according to claim 1 the related information includes a date, an attacher, and an object kind.

5. The information processing apparatus of claim 4 wherein said object is an image or voice and the corresponding object kind is respectively image or voice.

6. A recording medium in which a program for causing a computer to execute information processing for providing position information indicative of a position of a home page having at least one object recorded, said program comprising:
   a searching step for searching for and finding position information in a database storing discrimination information assigned to the object and said position information of the corresponding home page;
   a collection step for collecting said discrimination information of the object from the home page and the position information of the home page and for registering the collected discrimination information and position information in said database, wherein said collection step further includes collecting related information related to said object and registering said position information and related information corresponding to said discrimination information in said data base, wherein said related information includes a key word used to search for discrimination information assigned to said object;
   an issue step for issuing new discrimination information assigned to the object and storing said new discrimination information on said database when said discrimination information has not previously been registered in said database;
   an adding step for adding a degree of importance to the object;
   a preparing step for preparing a list of said position information found in the searching step arranged in order of said degree of importance;
   a transmission step for transmitting said list of position information and said new discrimination information to said terminal;
   an interface step for receiving said key word from said terminal; and
   a reverse processing step for searching said discrimination information corresponding to the key word received from said interface step;
   wherein said transmission step further includes transmitting the search result having said discrimination information to said terminal for use in creating said search request.

* * * * *